(No Model.) 2 Sheets—Sheet 1.
S. J. AUSTIN.
SCALE BEAM.
No. 251,086. Patented Dec. 20, 1881.
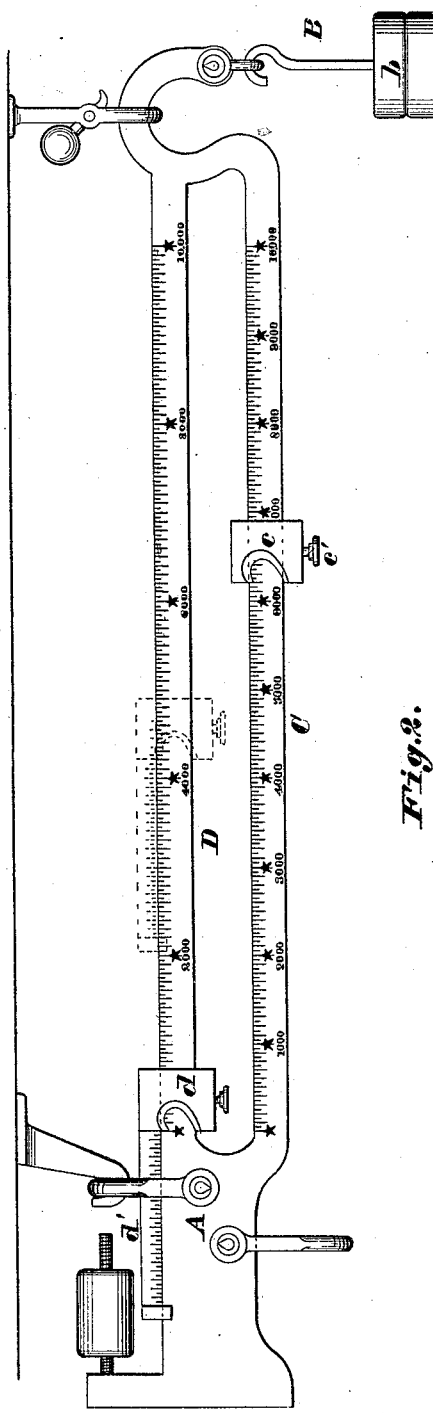
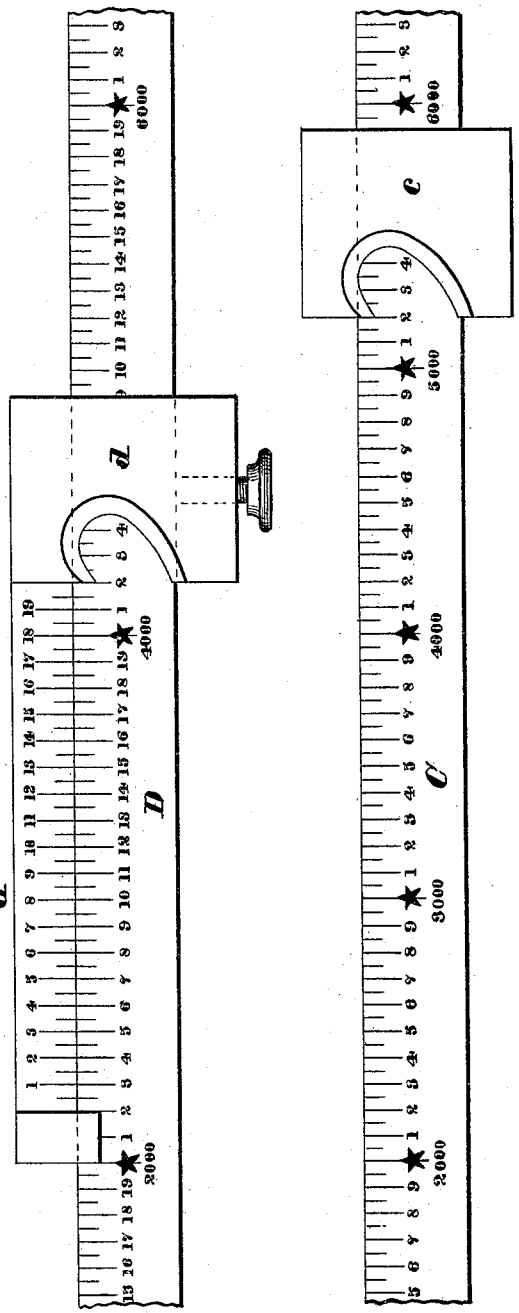
Attest:
Charles Pickles
Geo. H. Knight
Inventor:
Stephen J. Austin
By Knight Bro.
Attys.
N. PETERS, Photo-Lithographer, Washington, D. C.

(No Model.) 2 Sheets—Sheet 2.
S. J. AUSTIN.
SCALE BEAM.
No. 251,086. Patented Dec. 20, 1881.
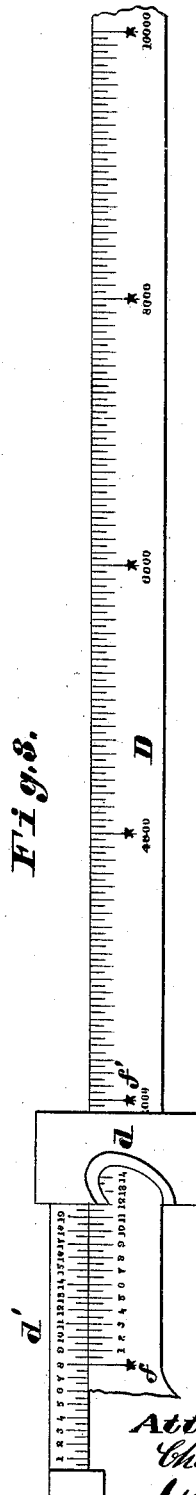
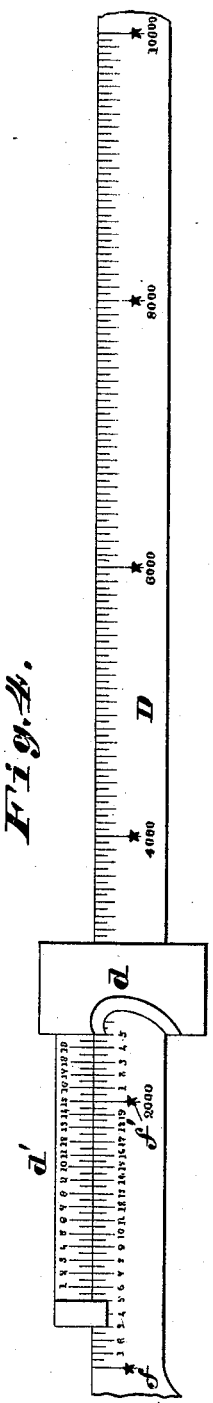
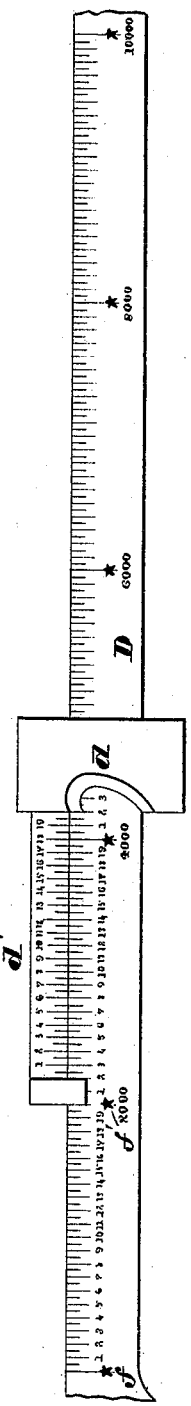
Attest
Charles Pickles
Geo. H. Knight.
Inventor.
Stephen J. Austin
By Knight Bros.
Attys.

UNITED STATES PATENT OFFICE.

STEPHEN J. AUSTIN, OF TERRE HAUTE, INDIANA.

SCALE-BEAM.

SPECIFICATION forming part of Letters Patent No. 251,086, dated December 20, 1881.

Application filed August 1, 1881. (No model.)

*To all whom it may concern:*

Be it known that I, STEPHEN J. AUSTIN, of Terre Haute, in the county of Vigo and State of Indiana, have invented a certain new and useful Improvement in Scale-Beams, of which the following is a full, clear, and exact description, reference being had to the accompanying drawings, forming part of this specification.

My present invention relates to a beam to be used principally in weighing coal on track-scales at coal mines; and my invention consists in a beam having two arms, one of which is graduated and adapted for weighing the car and the other for weighing the different miners' car-loads of coal, the weight of each load being given, and also the total weight of any number of loads. The arms may be on the same longitudinal plane; but I prefer to place them in a vertical plane, as shown in the accompanying drawings, in which—

Figure 1 is a side view of the beam. Fig. 2 is an enlarged detail side view of the two arms. Figs. 3, 4, and 5 are diagrams of the arm for weighing the miners' car-loads, illustrating my invention, which lies therein.

The beam has the usual knife-edges, A, and counter-balance B, with weights $b$. The arm C, which I have shown to be the lower one, is also of common construction, and is provided with an ordinary poise, $c$, with a set-screw, $c'$.

D is the upper arm of the beam, and the one containing my invention. It has a poise, $d$, carrying a sliding indicator, $d'$. I have shown it as graduated in sections of two thousand pounds each, and the indicator $d'$ is correspondingly graduated. It is proper to state that in this class of weighing it is customary to take the nearest half hundred pounds, and the miners' loads are seldom, if ever, any closer weighed.

In order that my invention may be fully understood, I will proceed to describe its operation.

The weight of the car is first taken on the lower beam with the aid, perhaps, of one or two weights added to the counter-balance. When the weight of the car which is to receive the different miners' car-loads is thus ascertained, the set-screw $c'$ of the poise $c$ is tightened up, holding the poise to its adjustment. Now, the next thing to be done is to dump into the car upon the scales a miner's car-load of coal. Then the poise $d$, which until now is at the extreme left-hand end of the arm, as shown in Fig. 1, is moved to the right on its arm until it balances the miner's car-load. Now, suppose the weight of this miner's car-load to be twelve hundred pounds, the poise will so indicate it. (See diagram Fig. 3.) Thus the weight of the first miner's load is ascertained. Another miner's car-load is now dumped on, and before moving the poise $d$ out on its arm, to balance these two miners' loads. Notice which numeral on the indicator $d'$ is over the star $f$ at the left of the arm. In this case it is the numeral 8. (See Fig. 3.) Now move the poise out to a balance, and suppose the second miner's car-load to weigh thirteen hundred pounds, said numeral 8 will then stand over the numeral 13 on the arm. (See diagram Fig. 4.) Thus the respective weights of the two miners' car loads are given, and also the total weight—twenty-five hundred, which is given on the poise $d$. Now another miner's car-load is dumped on, and before moving out the poise $d$ notice, as before, what numeral on the indicator is over the second star, $f'$, on the arm. In this case it is the numeral 15, (see Fig. 4,) and suppose the third miner's car-load of coal to weigh seventeen hundred pounds, the said numeral 15 will then, when the poise balances the whole amount of coal, stand over the numeral 17 on the arm. (See diagram Fig. 5.) Thus the weighing may proceed until the car on the scales is loaded, a note of each separate miner's load being taken, and the total weight being given with the poise $d$.

I have shown the beam to weigh ten thousand pounds, and after it is run a weight may be added to the counter-balance and the arm run over again in the same way, adding the weight which is left over on the right in weighing the last miner's car-load to the weight that is used on the left in weighing the next car, thus giving the whole weight of the next car by the simple mental process of adding together two small numbers.

Having thus described my invention, the following is what I claim as new therein and desire to secure by Letters Patent:

1. In combination with the arm C, for taking the weight of the car, the arm D, graduated in sections, substantially as shown, and provided with a poise, $d$, carrying graduated arm $d'$, as and for the purpose set forth.

2. An arm of a scale-beam graduated in sections and having a poise and indicator, the latter correspondingly graduated, as and for the purpose set forth.

S. J. AUSTIN.

In presence of—
 EDWARD REED,
 WM. EGGLESTON.